US011165862B2

(12) United States Patent
Austin et al.

(10) Patent No.: US 11,165,862 B2
(45) Date of Patent: Nov. 2, 2021

(54) SYSTEMS AND METHODS OF BLOCKCHAIN PLATFORM FOR DISTRIBUTED APPLICATIONS

(71) Applicant: 0Chain, LLC, San Jose, CA (US)

(72) Inventors: Thomas H Austin, San Jose, CA (US); Saswata Basu, Cupertino, CA (US)

(73) Assignee: 0Chain, LLC, San Jose, CA (US)

( * ) Notice: Subject to any disclaimer, the term of this patent is extended or adjusted under 35 U.S.C. 154(b) by 193 days.

(21) Appl. No.: 15/994,946

(22) Filed: May 31, 2018

(65) Prior Publication Data
US 2019/0124146 A1 Apr. 25, 2019

Related U.S. Application Data

(60) Provisional application No. 62/707,177, filed on Oct. 24, 2017.

(51) Int. Cl.
*H04L 29/06* (2006.01)
*H04L 29/08* (2006.01)
(Continued)

(52) U.S. Cl.
CPC ......... *H04L 67/1059* (2013.01); *G06Q 20/06* (2013.01); *G06Q 20/0658* (2013.01); *G06Q 20/223* (2013.01); *H04L 9/0637* (2013.01); *H04L 9/0643* (2013.01); *H04L 9/0841* (2013.01); *H04L 9/0894* (2013.01); *H04L 9/3236* (2013.01); *H04L 9/3297* (2013.01);
(Continued)

(58) Field of Classification Search
CPC .............. H04L 67/1059; H04L 9/0637; G06Q 20/0658
See application file for complete search history.

(56) References Cited

U.S. PATENT DOCUMENTS 6,654,908 B1 * 11/2003 Lindsay .............. G06F 11/0712
707/999.006
2003/0105954 A1 * 6/2003 Immonen ........... G06Q 20/1235
713/156
(Continued)

OTHER PUBLICATIONS

Rob Glenn and Stephen T. Kent, The NULL encryption algorithm and its use with ipsec. RFC, 2410:1-6, 1998.
(Continued)

*Primary Examiner* — Shawnchoy Rahman
*Assistant Examiner* — Lin Chang
(74) *Attorney, Agent, or Firm* — Levine's Tech Consulting, LLC; Frank E. Levine

(57) ABSTRACT

The systems and methods of a blockchain platform for distributed applications includes flexibility to implement a variety of client systems with a token usage and distributed computing based on separation of roles for a miner and a blobber. The message flow model between different parties including a client, a blobber and a miner allows for fast transactions on a lightweight blockchain by lightening the load on a mining network, i.e. a network of one or more miners. Offloading the work to a different group of machines allows for greater specialization in the design and specifications of the machines, allowing for the blockchain platform miners to be optimized for fast transaction handling and blockchain platform blobbers to be efficient at handling data for given transaction types.

20 Claims, 8 Drawing Sheets

(51) Int. Cl.
  *G06Q 20/06* (2012.01)
  *H04L 9/06* (2006.01)
  *H04L 9/08* (2006.01)
  *H04L 9/32* (2006.01)
  *G06Q 20/22* (2012.01)
(52) U.S. Cl.
  CPC ...... *H04L 63/1466* (2013.01); *H04L 2209/38* (2013.01); *H04L 2209/56* (2013.01)

(56) References Cited

U.S. PATENT DOCUMENTS

| | | | | |
|---|---|---|---|---|
| 2017/0161439 | A1* | 6/2017 | Raduchel | H04W 12/06 |
| 2018/0060496 | A1* | 3/2018 | Bulleit | H04L 9/3239 |
| 2018/0240107 | A1* | 8/2018 | Andrade | G06Q 20/36 |
| 2019/0020661 | A1* | 1/2019 | Zhang | H04L 9/3242 |
| 2019/0363889 | A1* | 11/2019 | Wang | H04L 9/0643 |

OTHER PUBLICATIONS

Ralph C Merkle, A digital signature based on a conventional encryption function. In Advances in Cryptology—CRYPTO '87, A Conference on the Theory and Applications of Cryptographic Techniques, pp. 369-378. Springer, 1987.
Satoshi Nakamoto, Bitcoin: A peer-to-peer electronic cash system, 2009. URL: http://www.bitcoin.org/bitcoin.pdf.
Proof of replication. Technical report, Protocol Labs, Jul. 2017.
Filecoin: A decentralized storage network. Technical report, Protocol Labs, Aug. 2017.
David Vorick and Luck Champine, Sia: Simple decentralized storage. Technical report, Nebulous, Inc., Nov. 2014.
Shawn Wilkinson, Tome Boshevski, Josh Brandoff, James Prestwich, Gordon Hall, Patrick Serbes, Philip Hutchins, and Chris Pollard, Storj: A peer to peer cloud storage network. Technical report, Storj Labs, Inc., Dec. 2016.

* cited by examiner

SYSTEMS AND METHODS OF BLOCKCHAIN PLATFORM FOR DISTRIBUTED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a utility application related to and claims the benefit of priority from U.S. Provisional Patent Application No. 62/707,177 filed on Oct. 24, 2017.

FIELD OF THE INVENTION

The present invention is in the technical field of cloud computing. More particularly, the present invention is in the technical field of blockchain platform. More particularly, the present invention is in the technical field of distributed applications on a blockchain platform.

BACKGROUND

Internet is a global computer network providing a variety of information and communication facilities, consisting of interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications known to the industry fall short in multiple ways. First, there is no separation of roles on the blockchain based on the role of an entity for a given transaction. Each transaction follows a strict chain rules and is dependent on its preceding transaction. If one transaction fails, all subsequent transactions on the blockchain become unusable. While some blockchain platforms have developed a work-around those bad transactions, the methods are kludgy. Second, the computing time and inbuilt delay in any blockchain platform is dependent on the available computing resources of its nodes. In absence of a role model, a single node has several computing intense tasks that are slow to execute. A slow system becomes vulnerable and becomes open to attacks. Last, the current solutions do not allow for client flexibility in developing distributed applications with immutability and finality of transactions on a blockchain platform.

SUMMARY OF THE INVENTION

The present invention is systems and methods of a blockchain platform for distributed applications using a message flow model based on the role of the entity participating in a transaction. A system and/or method of message flow model on a blockchain platform, comprising: using a secure authentication module in each transaction to verify identity of a miner, a blobber or a client; using a data integrity module to uniquely identify data for a transaction and prevent data corruption using erasure coding; using a unique transaction identification from combination of the client, the data and a timestamp; using a preauthorized token; using authorized access based on predefined permissions; permitting an authenticated, authorized, verified transaction on the blockchain based on a set of two of the following three predefined communication messages comprising of: a first exchange and confirmation between a client and a miner directing connection with one or more blobbers with an optional Merkle root of the data; a second exchange and confirmation between a client and one or more of the selected blobbers using a marker; and a third exchange and confirmation between the selected blobber and the miner confirming the marker; wherein the exchange and confirmation communication messages include a transaction of one or more of the following: sending, processing or receiving one or more initiate, update, read, write or delete requests; forbidding a transaction on the blockchain that is one or more of the following: not authenticated, not authorized, not verified, and does not use the set of two of the three predefined communication messages.

The system and method of message flow model on a blockchain platform, wherein the sending, processing or receiving of one or more requests further comprising: receiving from one or more miners a confirmation of the request on the blockchain with a list of one or more approved blobbers; initiating the request to one or more approved blobbers from the list using a secure authentication exchange; verifying the identity of each of the approved blobber using secure authentication response from the approved blobber; optionally encrypting the data for the request; applying erasure coding on the data for the request; and sending the data for the request to one or more approved and authenticated blobbers.

The system and method of message flow model on a blockchain platform, further comprising: the list of one or more approved blobbers is selected; or selecting blobbers from the list of approved blobbers; to geographically distribute data to increase the performance and availability of the data.

The system and method of message flow model on a blockchain platform, wherein the sending, processing or receiving of one or more read requests for stored data further comprising: receiving from one or more miners a confirmation of the read request on the blockchain with a selected blobber from a list of blobbers with the stored data and a time period for authorized access of the stored data; receiving data from the selected blobber within the authorized time period after the selected blobber has verified the read request.

The system and method of message flow model on a blockchain platform, wherein the optional Merkle root data is not sent by the client in the first exchange, further comprising: approving or contesting the Merkle root in the second or third exchanges.

The system and method of message flow model on a blockchain platform, further comprising: locking the authorized tokens for the authorized time period; releasing the authorized tokens after the authorized time period has expired.

The system and method of message flow model on a blockchain platform, wherein either one of the client, miner or blobber monitor for suspicious activity or report an error.

The system and method of message flow model on a blockchain platform, wherein the client or the miner can reconstruct a missing slice of the data from other available slices.

The system and method of message flow model on a blockchain platform, further comprising: verifying that the blobber is actually storing the data by periodically issuing challenge requests.

The system and method of message flow model on a blockchain platform, wherein the blockchain platform is not affected by attacks including one or more of the following: outsourcing, collusion, generation, sybil or replay attacks.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
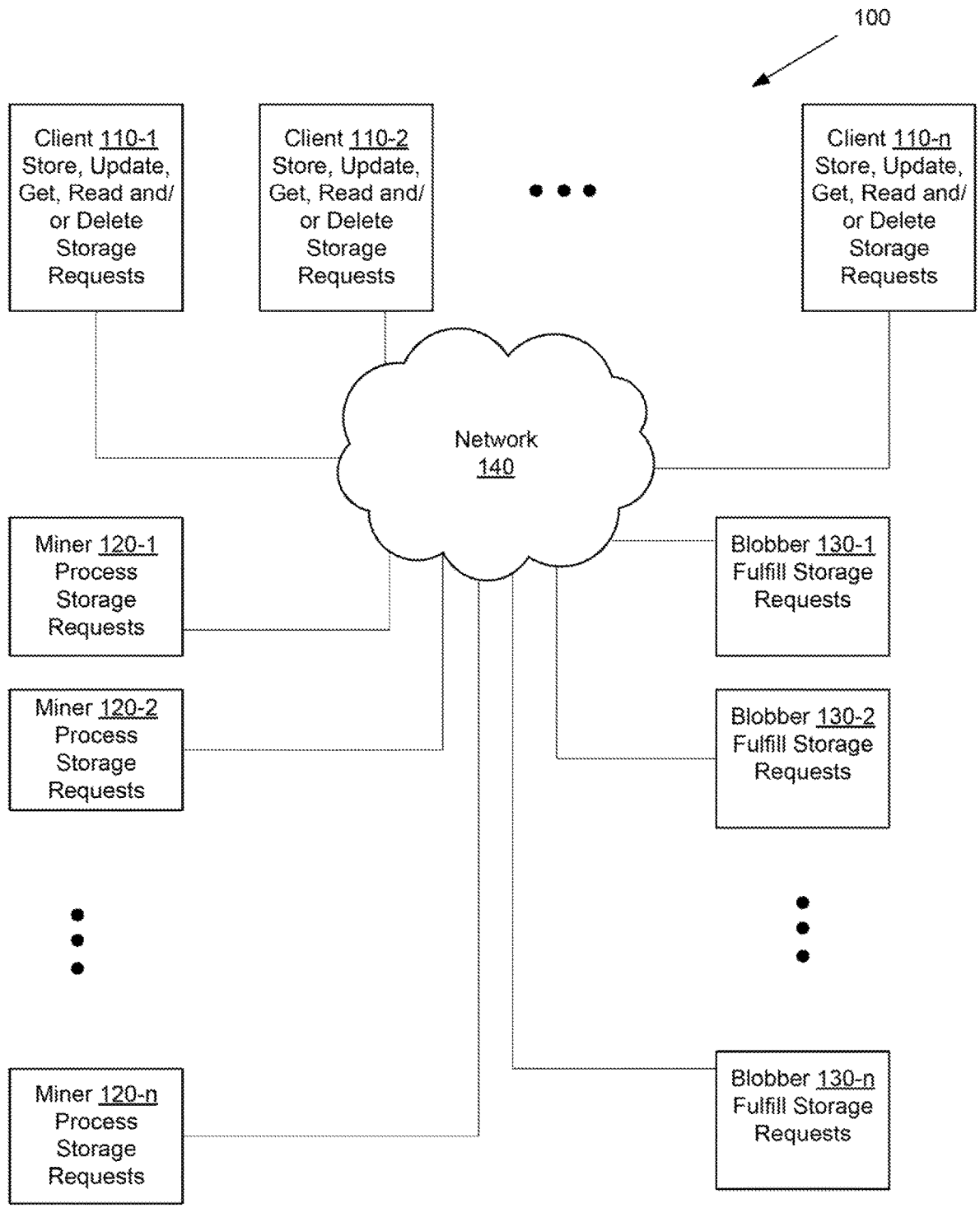
FIG. 1 shows a diagram illustrating an example of a system and method of a blockchain platform for distributed applications.

The systems and methods of a blockchain platform for distributed applications includes flexibility to implement client systems with a token usage and distributed computing based on separation of roles for a miner and a blobber. The message flow model between different parties including a client, a blobber and a miner allows for fast transactions on a lightweight blockchain by lightening the load on a mining network, i.e. a network of one or more miners. Offloading the work to a different group of machines allows for greater specialization in the design and specifications of the machines, allowing for the blockchain platform miners to be optimized for fast transaction handling and blockchain platform blobbers to be efficient at handling data for given transaction types.

In one embodiment, the distributed application is a storage application. Users of the system can request and get storage access without relying on a single source. While the distributed application described herein in detail is a storage application, a person of ordinary skill in the art would understand and apply the same invention disclosure on different types of distributed applications. The use of a distributed storage application is exemplary and not limiting in anyways the scope of the invention.

In one embodiment, a storage protocol applied on the blockchain platform relies on the miners to serve as intermediaries in all storage transactions. Furthermore, the blockchain platform may enforce strict requirements on blobbers and blobbers' machines to ensure a fast and lightweight response time and execution.

In one embodiment, data integrity of the transaction is verified by using hash of a file's contents. In another embodiment, the data is fragmented in two or more parts and each data part is separately hashed to create a Merkle tree. In one embodiment, the entire Merkle tree is stored and probabilistically verified. In another embodiment, the miners store the Merkle root of the stored files.

The role-based distributed execution using a message flow model on a blockchain platform allows for a flexible and robust model with feedback and evaluation of different parties based on past interactions. For example, the blockchain platform involves interaction between two or more clients, who have data that they wish to store, and blobbers who are willing to store that data for a fee. Neither the client nor the blobber necessarily trust one another, so transactions are posted to a blockchain produced by a trusted network of miners, i.e., a trusted mining network.

Players. The blockchain platform using a message flow model for role-based distributed work seeks to minimize the load on the mining network, so miners are not directly involved in the file transfer between clients and blobbers. Nonetheless, the transactions posted to the blockchain assures clients that their data is stored and gives blobbers confidence that they will be paid for their service; if either party misbehaves, the blockchain platform has the information to help identify cheaters.

Each client includes an application responsible for encrypting the data. The blockchain platform relies on erasure coding, which is also performed by the client. Clients are assumed to have a public/private key pair and a certain amount of tokens. Erasure coding is a method of data protection in which data is broken into fragments, expanded and encoded with redundant data pieces and stored across a set of different locations or storage media. A miner works on a central chain of the blockchain platform. For example, in the context of storage, miners are responsible for accepting requests from clients, assigning storage to blobbers, locking client tokens to pay for their storage, and testing that blobbers are actually providing the storage that they claim. A blobber is responsible for providing long-term storage. Blobbers only accept requests that have been approved by the mining network, which helps to prevent certain attacks. Blobbers are paid in three ways: (i) When data is read from them, the clients give them special markers that the blobber can redeem for 0chain tokens; (ii) When client writes data to them, blobbers get special markers; and (iii) whenever a blobber is storing data, they are randomly challenged to provide special blocks and if these challenges are passed, the mining network rewards the blobber with 0chain tokens.

Protocol Sketch. For example, one basic message flow model based on roles on a blockchain platform for a distributed storage application can be broken into five parts. First, clients must use tokens to reserve system resources. These resources include the amount of storage, the number of reads, and the number of writes needed for the data. The client's tokens are locked for a set period of time. Once the time has elapsed, the client regains their tokens and loses their storage resources. Of course, a client may decide to re-lock their tokens to maintain their resources, though the amount of tokens needed may change depending on the economy.

When clients want to use the resources that they have purchased, they must write a transaction to the network declaring their intent. The mining network connects the clients with the appropriate blobbers and allows them to set up a secure connection.

Once the connection is established, the mining network no longer acts as an intermediary between the client and the blobbers. During this phase, the client generates markers to give to the blobber in exchange for access to system resources. The blobber collects these markers and redeems them with the mining network once the transaction is complete; this transaction also notifies the blobber that the transaction has finished, and lets the network know that the miner and blobber agree on the data that the blobber is expected to store. In one embodiment, the markers help resolve disputes in case the client and blobber do not agree on the Merkle root.

After the blobber has completed the transaction, the mining network will periodically challenge the blobber to provide a randomly chosen block of data. These challenges involve a carrot and stick approach; blobbers are punished if they fail the challenge, and blobbers are rewarded with additional tokens when they pass the challenge. The blockchain platform ensures that blobbers are paid even when the data is not frequently accessed. When the client no longer wishes to store a file, they issue a transaction to the network. Once it is finalized, blobbers delete the file and clients may use their storage allocation to store other files.

Error and Repair. For example, one or more error reporting protocol and/or repair protocol would work with the basic message flow model based on roles on a blockchain platform for a distributed storage application. In one embodiment, the error reporting protocol allows both clients and blobbers to report problems to the network. These problems could include either reports of when other clients or blobbers are acting maliciously, or when a system fails or drops from the network unexpectedly.

In one embodiment, a repair protocol arises when a blobber is identified as malicious, drops from the network, or is no longer considered suitable for storing the data that it has. When needed, the client can read the data from the network, reconstruct the missing fragment of data, and re-upload it to the network. In one embodiment, the mining network reconstructs a missing slice of the data from any other available slices without involving the client.

Attacks. The message flow model for the blockchain platform is robust and resilient to different types of attacks. For example, an outsourcing attack arises when a blobber claims to store data without actually doing so. The attacker's goal in this case is to be paid for providing more storage than is actually available. For example, if Alice is a blobber paid to store file123, but she knows that Bob is also storing that file, she might simply forward any file requests she receives to Bob. The blockchain platform defense against this attack is to require all data requests to go through the mining network. Since the cheater must pay the other blobbers for the data, this attack is not profitable for the cheater. Additionally, the mining network's blockchain gives some accounting information that can be analyzed to identify potential cheaters.

Another attack may occur if two blobbers collude, both claiming to store a copy of the same file. For example, Alice and Bob might both be paid to store file123 and file456. However, Alice might offer to store file123 and provide it to Bob on request, as long as Bob provides her with file456. In this manner, they may free up storage to make additional tokens. In essence, collusion attacks are outsourcing attacks that happen using back-channels. A Sybil attack in the context of storage is a form of collusion attack where Alice pretends to be both herself and Bob. The concerns are similar, but the friction in coordinating multiple partners goes away. The blockchain platform message flow based model requires that the blobbers are assigned randomly for each transaction, helping to further reduce the chance of collusion.

The blockchain platform uses erasure codes to help defend against unreliable blobbers in a network. Furthermore, the blockchain platform makes demands on the capabilities of blobbers authorized to use the platform. For example, if it repeatedly underperforms expectations, a blobber's reputation may suffer, and risk being dropped from the network.

In another attack, a client might attempt to double-spend their tokens to acquire additional resources. However, the client is not given access to its resources until the transaction has been finalized. The blockchain platform transactions are designed for rapid finalization, so the delay for the client should be minimal. Other attacks such as fraudulent transactions are the purview of the mining protocol and the blockchain platform is well designed with defenses based on its robust implementations of authentication and data integrity modules. A replay attack also fails on the blockchain platform with the use of timestamps as one of the fields to assign unique transaction id.

Finally, generation attacks may arise if a blobber poses as a client to store data that they know will never be requested. By doing so, they hoped to be paid for storing this data without actually needing the resources to do so. The blockchain platform can defend against generation attacks with a challenge protocol that requires blobbers to periodically provide files that they store.

Locking System Resources. The message flow model for the blockchain platform is robust and resilient in locking system resources and reusing the same when resources are freed. For example, in order to store files, clients must use their tokens to purchase a certain amount of storage for a year. During this period, the clients' tokens are locked and cannot be sold. Likewise, to access or update their data, clients must purchase a certain number of reads and writes. To lock tokens, the client posts a transaction to the mining network. For example, the transaction includes the following without limitations: (i) the id of the client (client_id); (ii) the amount of storage (amt_storage); (iii) the number of reads (num_reads); (iv) the number of writes (num_writes); (v) a params field for any additional requirements allowing for flexibility. Only one of amt_storage, num_reads, and num_writes is required, since a client may be locking additional resources to supplement a previous transaction. However, the blockchain platform generally expects a client to lock all three in any transaction.

A person of ordinary skill in the art would understand that there are well-established methods and techniques to establish a secure digital connection between any two parties on the internet. The blockchain platform relies on the well-established methods to establish a secure connection with an added layer of security based on the role of the party i.e. the role of a client, a blobber or a miner. Neither the client nor the blobber trust one another, yet the blockchain platform allows both parties acting in its own best interest to nonetheless benefit each other. Any transgressions can be identified by the mining network of the blockchain platform with one or miners having the authority to punish any misbehaving party.

Creating a Connection. In establishing a connection, the blockchain platform performs the following: (i) assign blobbers to handle a client's request; and (ii) to ensure that the mining network knows what data the client wishes to store, allowing the network to police the client's and blobber's behavior. In one embodiment, the client and the blobber establish a session key between themselves. In another embodiment, the client and blobber set up a Transport Layer Security (TLS) connection instead of a session key.

On the blockchain platform, data blobs are identified by a combination of the client's unique id (client_id) and the client-chosen data_id. Individual transactions are assigned a trans_id based on the triple of these two fields and a timestamp (T). In addition to creating unique ids for transactions, the timestamp also ensures that each request is fresh and helps defend against replay attacks.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of a blockchain platform based on a message flow model for implementing different distributed applications. In the example of FIG. 1, the environment includes a first client system 110-1 through an nth client system 110-n, network 140, miner system 120-1 through an nth miner system 120-n and blobber system 130-1 through an nth blobber system 130-n. In an implementation, the client system 110 includes components to store, update, get, read, write and/or delete requests. In one implementation, the client system 110 includes storage requests. A client can implement many types of flexible and distributed applications on the client system 110 using the client aspect of the blockchain platform using a message flow model.

In one implementation, the miner 120 includes components to process requests from the clients including storage requests. Two or more miners form a mining network. In one implementation, the blobber 130 includes components to fulfill storage requests that are initiated by the client 110 and approved by miner 120.

Network 140 can be different wireless and wired networks available to connect different computer devices including client and server systems. In an implementation, network 140 is publically accessible on the internet. In an implementation, network 140 is inside a secure corporate wide area network. In an implementation, network 140 allows connectivity of different systems and devices using a computer-readable medium. In an implementation, the block chain platform using a message flow model allows users on the client system, the blobber or the miner to set privacy settings that allow data to be shared among select family and friends, but the same data is not accessible to the public. In an implementation, the block chain platform using a message flow model allows users on the client system, the blobber or the miner to encrypt data to be shared among select family and friends, but the same data while available cannot be decoded by the public.

The messaging and notification between different components can be implemented using application programming interface (API) calls, extensible markup language ("XML") interfaces between different interfaces, Java/C++ object oriented programming or simple web-based tools. Different components may also implement authentication and encryption to keep the data and the requests secure.

Figure 2:
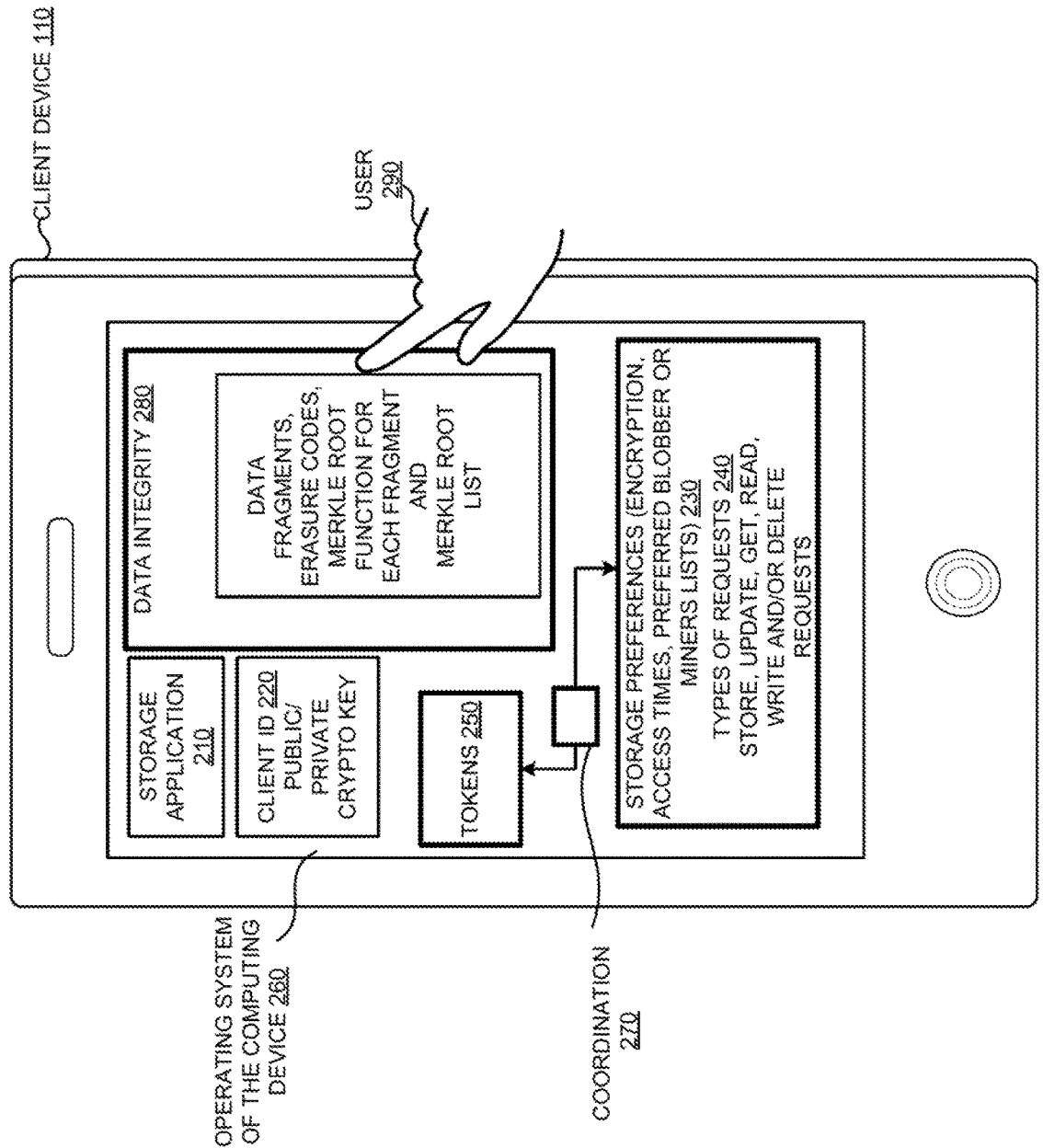
FIG. 2 shows an exploded view of a client computing system illustrating different subroutines, according to one embodiment.

FIG. 2 is an exploded view of a client system 110 shown in FIG. 1. For a distributed storage application implementation, the client has a storage application 210 that interacts with the operating system 260 of the client computing device. For example, the client computing device may have family photos, videos or business-related files for storage. The client uses a client_id 220 with a Diffie Hellman public and private cryptography keys to establish session keys. In one embodiment, the client and the blockchain platform uses Transport Layer Security, i.e. symmetric keys are generated for each transaction based on a shared secret negotiated at the beginning of a session. The client gets preauthorized tokens 250 for storage allocation on the blockchain platform. The storage preferences for the client are coordinated using 270. A client's storage preferences 230 include encryption, access times, preferred blobber or miner lists, etc. Types of requests 240 include store, update, get, read, write and/or delete requests. The data integrity 280 includes techniques to create a unique hash based on available data, encryption of the data, division of data into fragments, use of erasure codes, Merkle root and Merkle tree creation based on data fragments and a Merkle root list for different types of data. A client may use one or more options in different types of combinations to preserve data integrity 280 verification when sending data out on the system to different blobbers on the blockchain platform. In one implementation, the client has an option to create its own data_id for selected data. In one implementation, the client gets an automatically generated data_id based on different client preferences and parameters of usages. A user 290 is shown using the client device 110. In one implementation, the client system includes module to report errors when a blobber does not send an anticipated message. In one implementation, the client system monitors the blockchain for different suspicious activities related to its own work.

Figure 3:
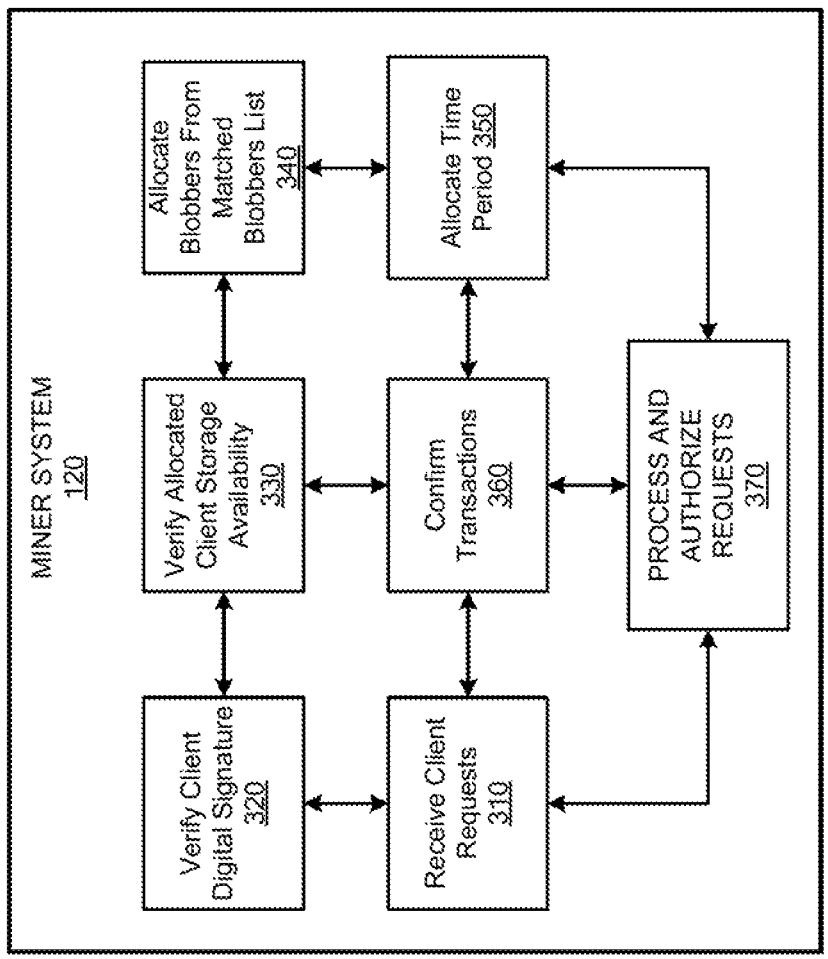
FIG. 3 is an exploded view of a miner computing system illustrating different modules and functions, according to one embodiment.

FIG. 3 is an exploded view of a miner system 120 of FIG. 1. The different components or modules included in a miner system includes a module to process and authorize requests 370, receive client requests 310, verify client digital signature 320, verify whether client is allowed to make a particular request based on allocated storage for a client and availability on the system 330, allocate blobbers from a matched blobber list 340, allocate time period to complete the transaction 350, and confirm transaction 360 on the blockchain platform. In one implementation, the miner system includes module to monitor the blockchain for different suspicious activities. In one implementation, the miner system includes mechanism to handle error reports received from either a client or a blobber. In one implementation, the miner system includes ranking or evaluations for clients and/or blobbers associated with the blockchain platform.

Figure 4:
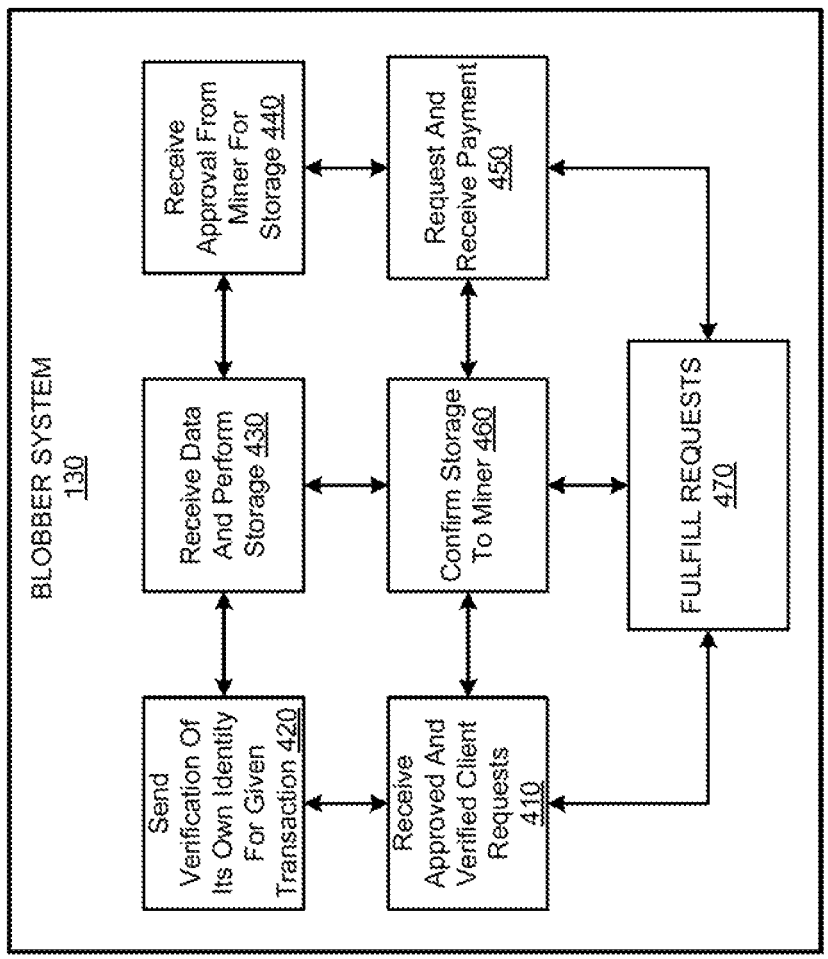
FIG. 4 is an exploded view of a blobber computing system illustrating different modules and functions, according to one embodiment.

FIG. 4 is an exploded view of a blobber system 130 of FIG. 1. The different components or modules included in a miner system includes a module to fulfill requests 470, receive approved and verified client requests 410, send verification of its own identity for a given transaction 420, receive data and perform storage 430, receive approval from miner for storage 440, confirm storage to miner 460, request and receive payment for storage and handling of the requests 450. In one implementation, the blobber system includes module to report errors when a client does not send an anticipated message. In one implementation, the blobber system monitors the blockchain for different suspicious activities related to its own work.

Figure 5:
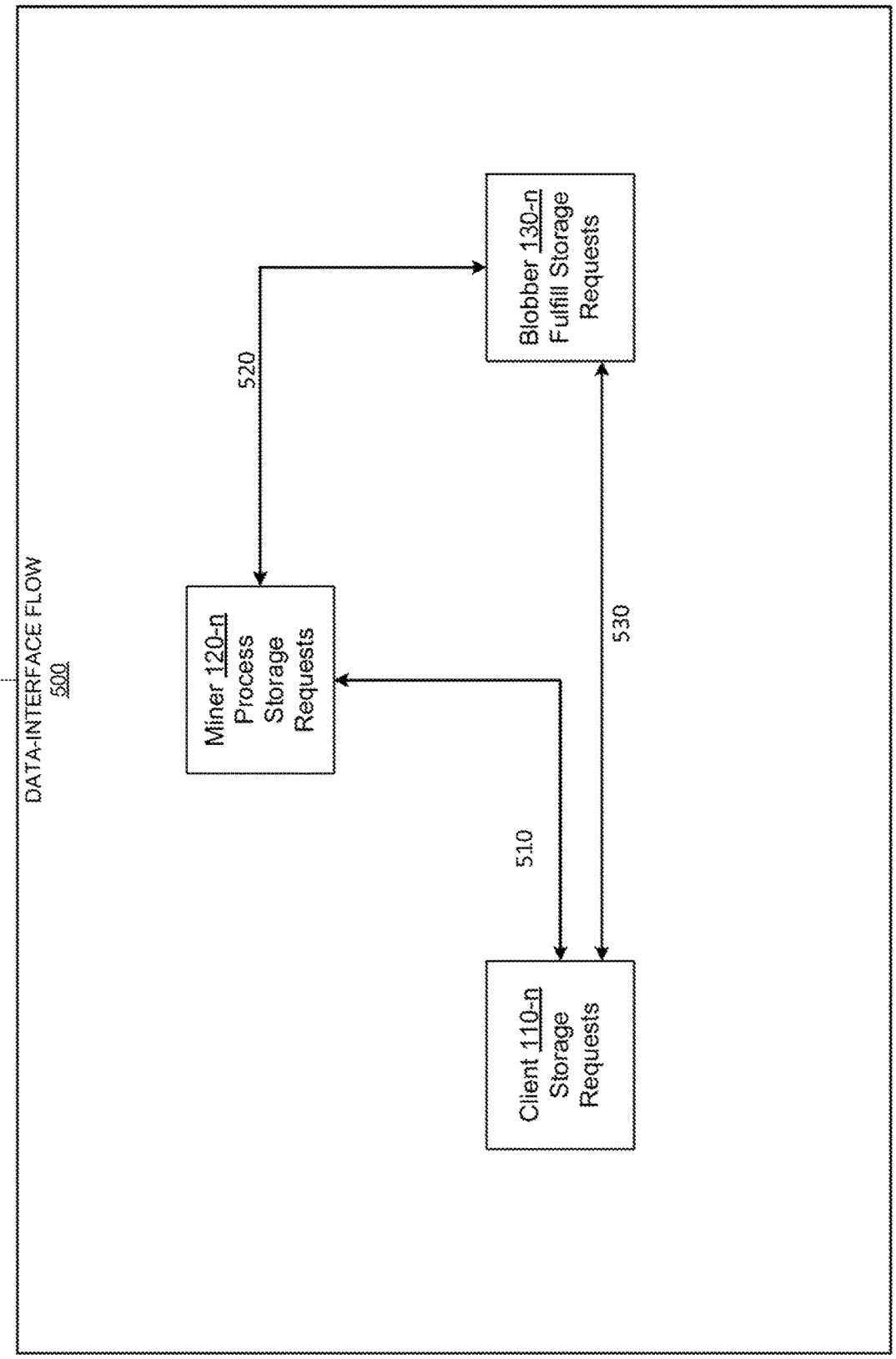
FIG. 5 shows the data interface bidirectional message flow between different roles in a blockchain platform, according to one embodiment.

FIG. 5 shows the data interface and bidirectional message flow between different role based entities on the blockchain. The message 510 is a request and acknowledge between client 110 and miner 120. The message 520 is a response to a client request 510 to allocate a blobber 130 to handle the client request in 510. The message 530 is the bidirectional message between client and blobber to fulfill the request.

Figure 6:
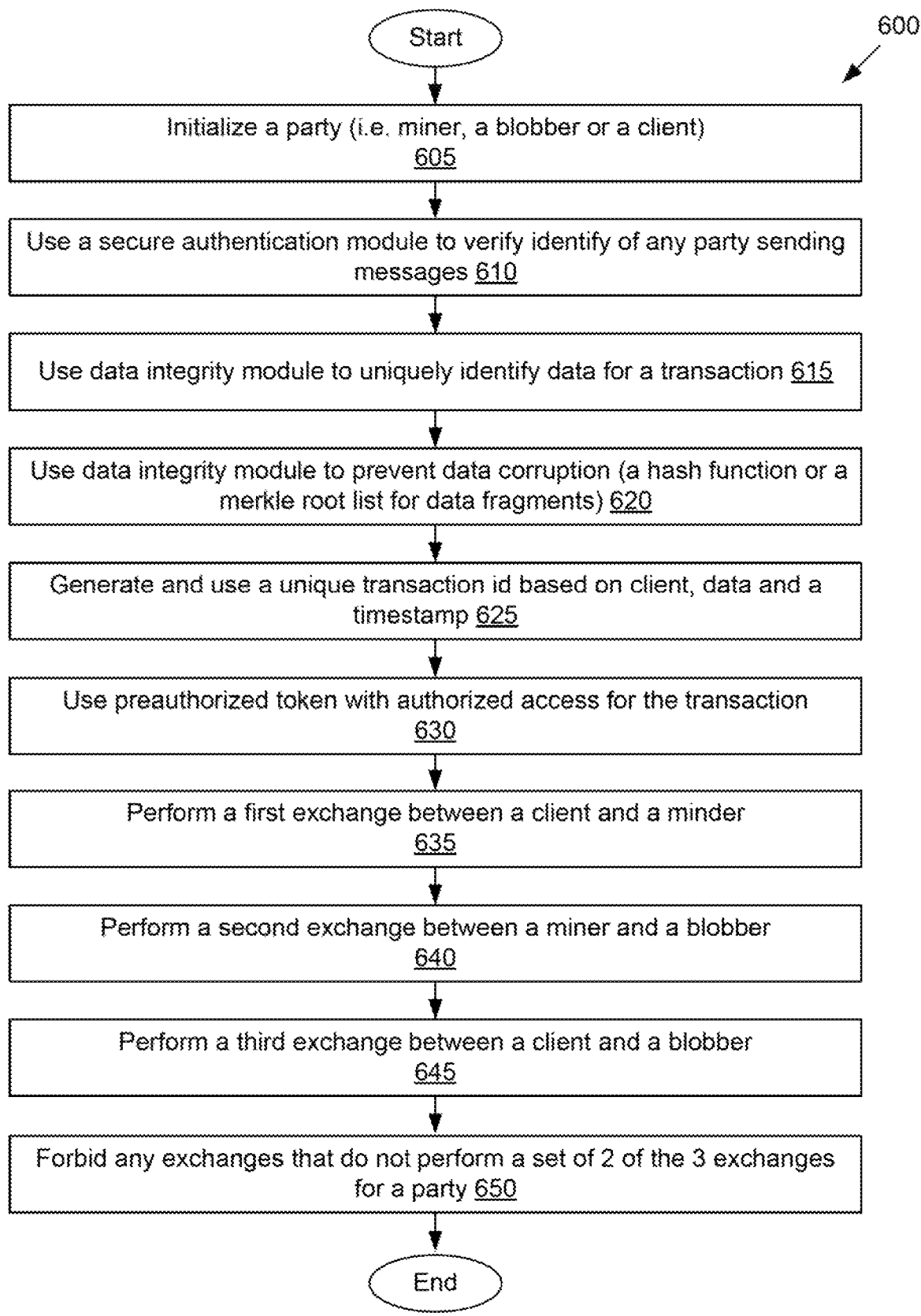
FIG. 6 shows a flowchart illustrating an example of a method of message flow model on a blockchain platform based on different roles of a party.

FIG. 6 depicts a flowchart 600 illustrating an example of a method for a blockchain platform using a message flow model based on role-based entities. The flowchart 600 is discussed in conjunction with the blockchain platform environment shown in the diagram 100 in FIG. 1. At block 605, a client, miner and/or a blobber system is initialized to use the blockchain platform using message flow model based on role-based entities. At block 610, use a secure authentication module to verify identity of any party sending messages. In one implementation, this is achieved by assigning a client id or blobber id used in combination with Diffie-Hellman public and private keys. In one embodiment, the client and blobber use a secure connection using Transport Layer Security. In one implementation the miners are also assigned miner ids and secure cryptographic certificates to ensure that the miner is trusted. At block 615, use data integrity module to uniquely identify data for a transaction. At block 620, use data integrity module to prevent data corruption, for example, a hash function or a Merkle root list for data fragments. At block 625, generate and use a unique transaction id based on the triple of client_id, data_id and a timestamp. At block 630, use preauthorized token with authorized access for the transaction. At block 635, perform a first exchange between a client and a miner. At block 640, perform a second exchange between a miner and a blobber. At block 645, perform a third exchange between a client and a blobber. At block 650, forbid any exchanges that do not perform a set of two of the three exchanges for an entity.

In broad embodiment, the invention is systems and methods of a blockchain platform for distributed applications including flexibility in client applications that are based on message flow model of role-based exchange of communication messages.

Figure 7:
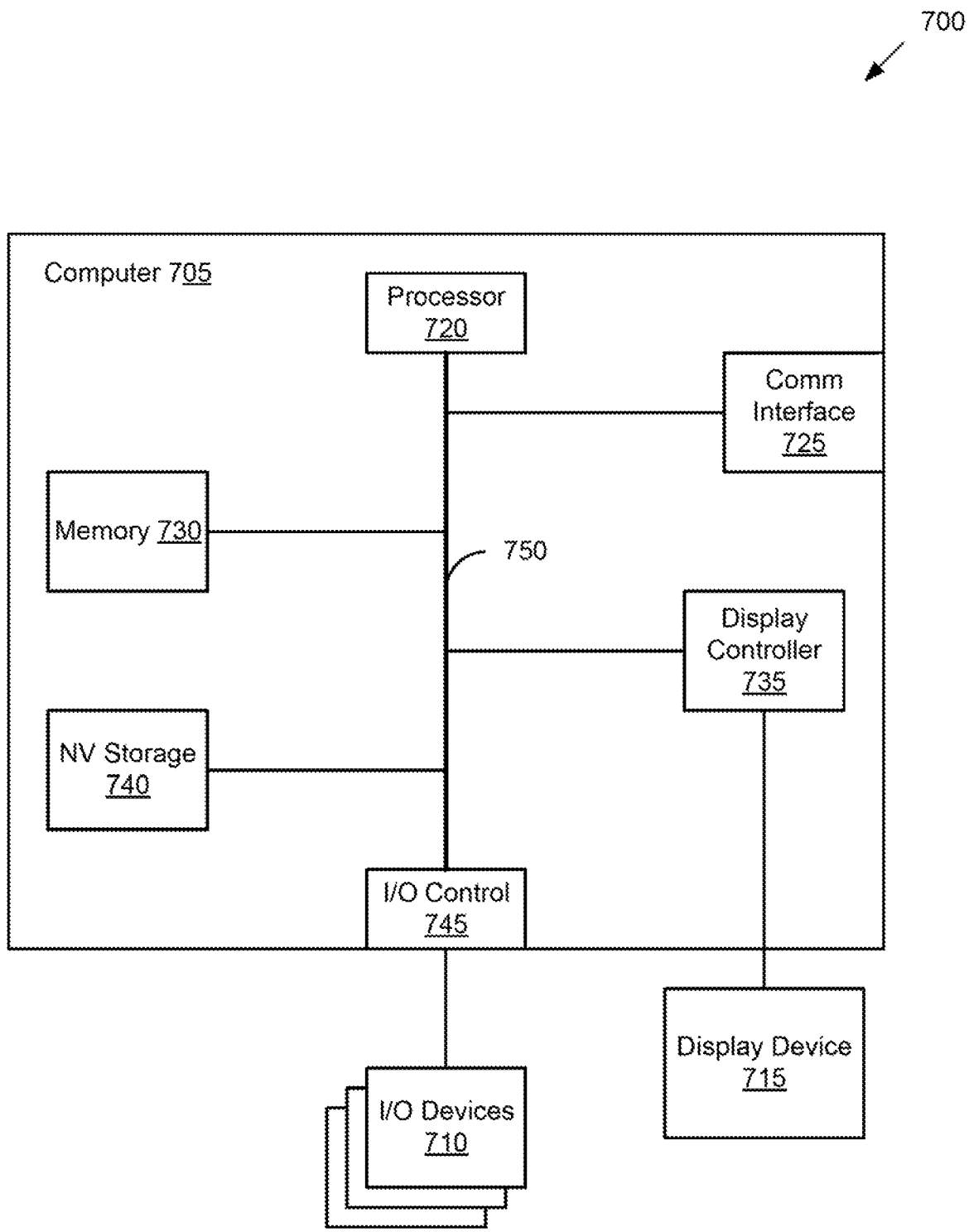
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, client system 110, a miner system 120 and/or blobber system 130 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

Figure 8:
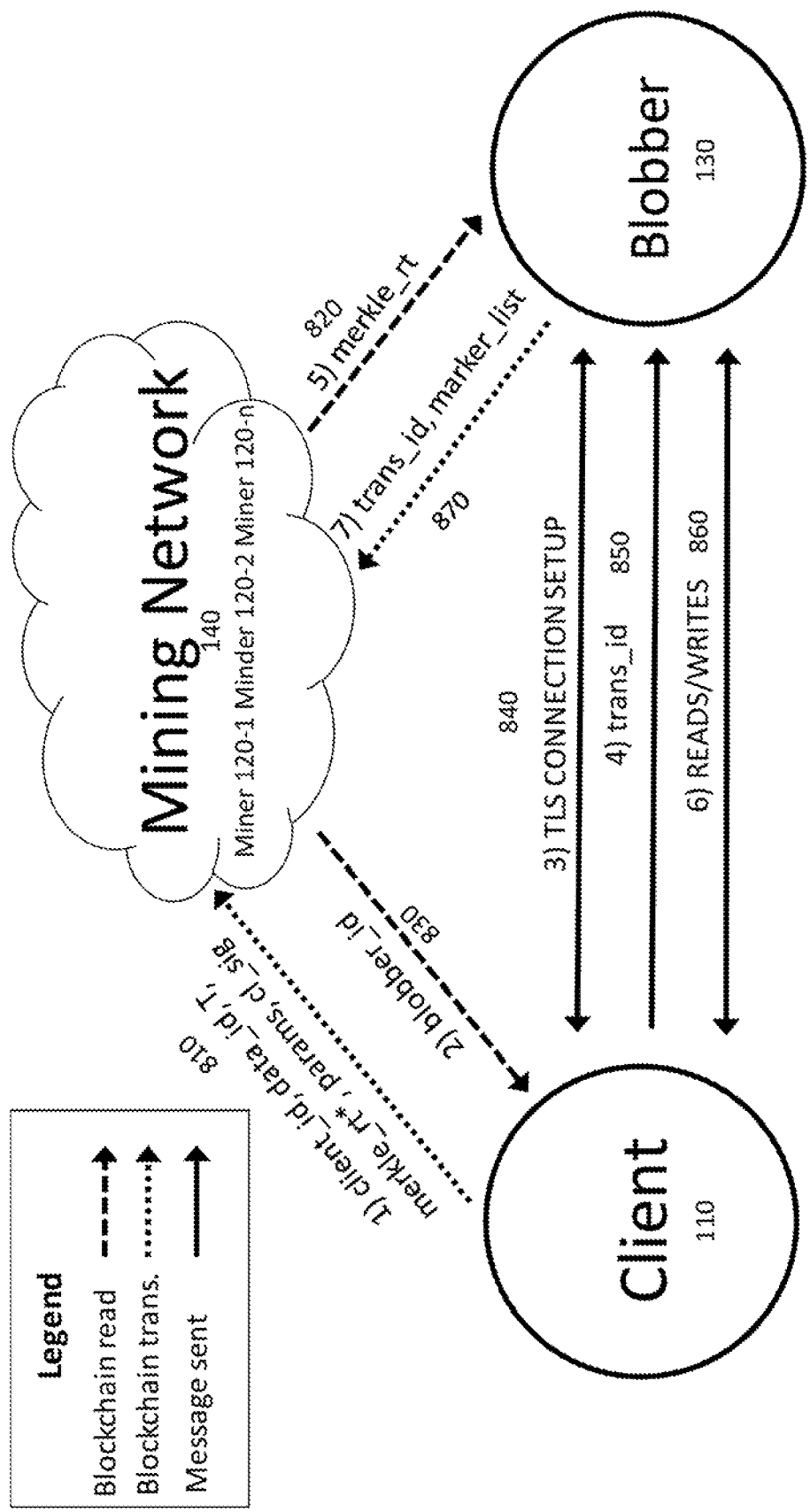
FIG. 8 gives the flow and exchange of messages between a miner, a blobber and a client.

FIG. 8 shows the process for establishing a connection between clients 110 and blobbers 130 with the authorization of one or more miners from the mining network 140 containing, for example, miner 120. Note that all content read from the blockchain (indicated by dashed lines) can be validated against miners' signatures. By the point this message flow model begins, client 110 is assumed to have used its tokens to lock the necessary storage, number of reads and number of writes that they need for their request. Note that clients 110 will typically create a group of transactions for their requests, depending on their erasure code settings, but these transactions are coordinated by the client. The stopes of the protocol are as follows: (1) The client 110 initializes the process by committing a transaction request 810 to the blockchain. The transaction includes: client_id, data_id, T, optional Merkle root of the data wherein if the Merkle root is not included the data is unchanged, additional parameters (params) for this request and the client's signature cl_sig1 signing the parameters listed herein. (2) The client monitors the blockchain until the transaction has been finalized. At that time, the client reads the transaction response 830 to determine the blobber_id of the blobber assigned to handle the request. (3) The client and blobber set up a Transport Layer Security (TLS) connection 840. (4) Once the connection has been established, the client sends trans_id (the triple of client_id, data_id, and T) 850. (5) The blobber reads the transaction from the blockchain, verifying that the request is valid and getting the Merkle root (Merkle_rt) to check the incoming data 820. If the Merkle root is unchanged from the blobber's records, the blobber can assume that the request is read-only, and handle the request accordingly. (6) The client may now read and write data from the blobber 860. (7) Once the session has completed, the blobber writes a transaction to the blockchain that both pays the blobber and commits the blobber to storing the data matching the Merkle root specified by the client in the first transaction. The trans_id in this transaction is the id of the client's initial transaction and includes a marker_list 870.

The information stored in the params field in message 1 depends upon the nature of the transaction. If this is a new file storage request, the k and n values for erasure coding must be included, since these settings affect the behavior of the network during challenges. Also, if this is a new file upload or a file update, the client must include the file size, the version number of the file, the fragment_id, chosen by the client, for this fragment of the erasure coded data.

A possible attack when creating a connection may include that a client might create a transaction on the mining network, but never send the data to the blobber, either as an attempt to damage a blobber's reputation or to prevent a blobber from being paid by other clients. On the blockchain platform, three factors mitigate this attack: (1) The client had to lock up tokens to perform this attack. In essence, they would be paying for storage without using it. (2) Blobbers are not challenged by the mining network until they post a transaction to finalize the data exchange. (3) Blobbers periodically monitor the blockchain for transactions involving them; if they notice this transaction, they can cancel it using a error reporting protocol.

Similarly, a blobber might not respond to the client and refuse to complete the connection. Again, several factors make this attack unlikely: (1) Once the connection is established, the client is expected to send markers. The blobber redeems these markers for tokens, and hence has a vested interest in completing the connection. (2) If the transaction times out, the client can report an error. (3) If the client becomes dissatisfied, they can delete their data from the blobber and reassign it to a different blobber. When this happens, the blobber is no longer paid for storing the data.

Reads and Writes. After establishing a secure connection as described above, the blockchain platform performs reads and writes as described herein. Once a secure connection has been established between the client and the blobber, the client can choose to either read data from the blobber or update data stored with the blobber. The blockchain platform for uploading or downloading files requires that the client compensate the blobber. This process is done through the use of special read_marker and write_marker values created by the client. Each marker is a pair of a number (i) and a signature, where "i" is a counter starting at 0 that is incremented with each marker sent. READ and WRITE are constants included in the signatures denoting whether this is a read_marker or write_marker respectively.

The format of a read_marker is [READ, trans_id, blobber_id, block_num, i]$_{client}$. The format of a write_marker is [WRITE, trans_id, blobber_id, hash(data), block_num, i]$_{client}$, where hash(data) is the hash of the current block of data being sent. The blobber collects these markers, and when the transaction has either completed or timed out, the blobber writes a transaction to the blockchain effectively cashing in the markers in exchange for tokens. This transaction has the following effects: (i) The blobber is paid in tokens. (ii) The client loses the corresponding number of reads and writes. (iii) The Merkle root of the data (if it has been updated) is confirmed by the blobber. At this point, the blobber may be challenged to provide the data that they store. Since the blobber is also compensated for passing these challenges, they have a vested interest in completing the operation. Note that future transactions only allow access to the data if there is no discrepancy between the client and the blobber on the Merkle root of the data.

Markers may serve as an additional authorization tokens, and hence the double-spending problem is a concern here. Blobbers might attempt to redeem a marker multiple times, or a client might attempt to pay different blobbers with the same marker. Each trans_id uniquely identifies the file involved, and the mining network does not accept markers if the trans_id does not match an existing transaction for an open connection. When the blobber redeems the markers, the connection is considered closed, and so the blobber cannot reuse the markers in a future transaction. Each marker must be unique within the redemption transaction, so the blobber is not able to double spend the marker within the transaction either. A client might attempt to pay multiple blobbers with the same marker. However, since both trans_id and blobber_id are included in the marker, this attack would fail.

If blobbers pose as clients, it is possible that they could generate markers without reading the data solely as a mechanism to get tokens. However, since the blobber would have to lock tokens to acquire reads, it would in some sense be paying itself with its own tokens.

Clients might create more markers than the number of reads and writes they have purchased, essentially writing checks that they cannot cash. Clients are expected to track the number of markers that they have used, and therefore are the best ones to hold accountable. On the blockchain platform, if a client exceeds the number of markers that they are authorized to create, the blobber are still paid. However, instead of paying the blobbers in newly-minted tokens, they are paid in tokens taken from the client.

Other type of attacks might include a blobber ignoring a client's request for data and simply cash the marker's sent by the client. However, in this case the client would quickly stop sending markers to the blobber, preventing the blobber from receiving additional payment. Furthermore, the client would report an error to the network, and might decide to delete their data from the blobber. The blobber might send invalid data; however, the client might have the Merkle tree, in which case they would quickly spot the problem and report an error. Regardless, the blobber is expected to store the Merkle tree and can asked to provide it. The mining network stores the Merkle root, preventing the blobber from providing a false tree.

In scenarios where a client simply writes data, the blobber might not store the data. However, when redeeming markers, the blobber must confirm the new Merkle root. Therefore, the mining network would be able to catch the blobber's cheating with the challenge protocol. In another scenario, a client might send different data to the blobber that does not match the Merkle root specified in the blockchain, either in a hope to damage the blobber's reputation or to frustrate the blobber by using its resources without paying it. The blobber cannot finalize the transaction, and therefore will not be challenged (and paid) for storing the data. However, the blobber can report the error to the mining network. Furthermore, every write_marker includes a hash of the block of data sent, which can serve as a form of proof about what data the blobber received from the client.

Deleting Files. To delete a file, the client posts a transaction to the blockchain deleting the resource. Once the transaction is finalized on the blockchain, the client regains the storage allocation. Blobbers are expected to poll the blockchain for these transactions. Once they notice that a file has been deleted, all blobbers storing slices of this data delete its data.

In some attacks, a client might attempt to get free storage by a distributed denial of service attack (DDoS) the blobbers before they receive the message to delete the data, but the mining network would not approve future read requests. Clients might attempt to delete data, but maintain an open connection with blobbers. With this approach, the client would attempt to get free storage without needing to go through the mining network. Our defense against this attack is that the mining network rejects all requests to delete data when there are open connections. If a blobber fails to close a connection, the client can report the error to the mining network and close the connection that way. Nothing on the blockchain platform enforces that the blobbers actually delete the data when asked though a blobber has little economic incentive to keep it. If the client is concerned about the confidentiality of its data, the client can encrypt its data before storage.

Challenge Request. In order to verify that a blobber is actually storing the data that they claim, our protocol relies on the miners periodically issuing challenge requests to the blobbers. The blockchain platform message flow model is also how blobbers are rewarded for storing files, even if the files are not accessed by any clients. When the blobber passes the challenge, it receives newly minted tokens.

The mining network is responsible for establishing consensus on whether the blobber has passed the challenge. A transaction is posted by the mining network specifying which block of data is requested. The blobber sends the data to the mining network as well as the nodes of the Merkle tree needed to calculate the Merkle root. If the mining network reaches consensus that the blobber failed to provide the correct data in the allocated time, a transaction is posted punishing the blobber. Otherwise, a transaction is posted rewarding the blobber with the token. In one embodiment, an update to existing data may be canceled. The blobber might not have the correct data, and so cannot satisfy future challenges. Therefore, these cases are treated as delete transactions.

Recovering Data. There could be scenarios when the blockchain platform needs to recover data. When a blobber disappears unexpectedly from the network, or when a canceled transaction causes data to be lost, the data needs to be regenerated and stored with another blobber. In one embodiment, the repair operation is performed by the client, who will be required to get the needed slices, regenerate the new slice, and post a new transaction to store the regenerated slice.

The cost of the transactions to recover the client's data is paid for by the client. However, if the loss is due to the misbehavior of a blobber, the blobber's stake may be seized and given to the client to help pay for the recovery.

If a client attempts to update data simultaneously with all blobbers, it is possible that all copies of the data could be deleted. In order to avoid this issue, the client can adjust the k and n values used in the erasure codes to provide greater resiliency and update the slices of data in sequence.

In one embodiment, the client must initially commit to the Merkle root of the data whenever a file is changed on the network. The result is that our transactions are either data writes or data reads. In one embodiment, the blockchain platform allows for reads and writes within a given client/blobber exchange. The client indicates the Merkle root is not yet known; when the blobber writes a transaction to cash their markers, they also commit to a Merkle root. The client can write a transaction on the blockchain either approving or contesting the Merkle root.

In one embodiment, the client can rebuild any data lost when a blobber goes offline unexpectedly. The client might not always be the best choice for this responsibility. If the client does not connect regularly, there might be a delay before they notice.

In one embodiment, when a blobber fails a challenge to provide a block of data, the mining network can initiate transactions to recover the missing fragment of data and reassign it to a different blobber. Any encryption by the client is performed before erasure coding to ensure that the data can be reconstructed without the client's aid.

Distributed Content Delivery Network. The blockchain platform using the message flow model can be used to geographically distribute data to increase the performance and availability of a client's data. A client may use encryption, distribute an application to reconstruct the data or use null encryption. The blockchain platform supports the ability for a client to stream content from a blobber.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

What is claimed is:

1. A method of message flow model on a blockchain platform, comprising:
   verifying in each transaction, using a secure authentication module, identity of a miner, a blobber or a client;
   uniquely identifying, using a data integrity module, data for a transaction and prevent data corruption using erasure coding;
   wherein a unique transaction identification from combination of the client, the data and a timestamp is used;
   locking one or more client tokens for a limited period of time after posting a transaction to a mining network wherein the transaction includes an identity of the client and at least one of: a number of reads, a number of writes, and an amount of storage;
   selecting the locked tokens to generate a specific number of markers wherein each marker is a pair of a number i and signature comprising at least one of a read marker and a write marker wherein a read marker signature has a form of [READ, trans id, blobber id, block number, i]$_{client}$ and wherein a write marker signature has a form of [WRITE, trans id, blobber id, hash(data), block number, i]$_{client}$
   permitting an authenticated, authorized, verified transaction on the blockchain based on three predefined communication messages:

a first exchange and confirmation between the client and a selected miner directing connection with one or more selected blobbers with an optional Merkle root of the data, wherein the one or more selected blobbers are assigned the transaction each time on a random basis;

a second exchange and confirmation between a client and the one or more of the selected blobbers using the marker and wherein the selected blobbers collect the markers; and a third exchange and confirmation between the selected blobber and the miner confirming the marker, and wherein the blockchain platform is configured to get the selected blobber paid from the locked tokens of the client;

wherein the exchange and confirmation communication messages include a transaction of one or more of the following: sending, processing or receiving one or more initiate, update, read, write or delete requests; and forbidding a transaction on the blockchain that is one or more of a group comprising: not authenticated, not authorized, and not verified, and wherein the transaction does not use the corresponding set of two of the three predefined communication messages correspond to each of the miner, the blobber and the client.

2. The method of claim 1, wherein the sending, processing or receiving of one or more requests further comprises:

receiving from one or more miners a confirmation of the request on the blockchain with a list of one or more approved blobbers;

initiating the request to one or more approved blobbers from the list using a secure authentication exchange;

verifying the identity of each of the approved blobber using secure authentication response from the approved blabber;

optionally encrypting the data for the request;

applying erasure coding on the data for the request; and sending the data for the request to one or more approved and authenticated blobbers.

3. The method of claim 2, further comprising:
i. the list of one or more approved blobbers is selected; or
ii. selecting blobbers from the list of approved blobbers;
to geographically distribute data to increase the performance and availability of the data.

4. The method of claim 1, wherein the sending, processing or receiving of one or more read requests for stored data further comprises:

receiving from one or more miners a confirmation of the read request on the blockchain with a selected blobber from a list of blobbers with the stored data and a time period for authorized access of the stored data; and receiving data from the selected blobber within the authorized time period after the selected blobber has verified the read request.

5. The method of claim 1, wherein the optional Merkle root data is not sent by the client in the first exchange, further comprising:

approving or contesting the Merkle root in the second or third exchanges.

6. The method of claim 1, further comprising:

locking the authorized tokens for the authorized time period;

releasing the authorized tokens after the authorized time period has expired.

7. The method of claim 1, wherein either one of the client, miner or blobber monitor for suspicious activity or report an error.

8. The method of claim 7, wherein the client or the miner can reconstruct a missing slice of the data from other available slices.

9. The method of claim 1, further comprising:

verifying that the blobber is actually storing the data by periodically issuing challenge requests.

10. The method of claim 1, wherein the blockchain platform is not affected by attacks including one or more of the following: outsourcing, collusion, generation, sybil or replay attacks.

11. A system of message flow model on a blockchain platform, comprising one or more processors;

a memory coupled to at least one of the processors;

one or more modules stored in the memory and executable by the one or more processors;

a network interface that connects the local node to one or more remote nodes; and a set of computer program instructions stored in the memory and executed by at least one of the processors in order to perform actions comprising:

securely authenticate in each transaction used to verify identity of a miner, a blobber or a client with an optional Merkle root of the data;

uniquely identify data and prevent data corruption using erasure coding for ensuring data integrity;

use a unique transaction identification from combination of the client, the data and a timestamp;

lock one or more client tokens for a limited period of time after posting a transaction to a mining network wherein the transaction includes an identity of the client and at least one of: a number of reads, a number of writes, and an amount of storage;

select the locked tokens to generate a specific number of markers wherein each marker is a pair of a number i and signature comprising at least one of a read marker and a write marker wherein a read marker signature has a form of [READ, trans id, blobber id, block number, i]$_{client}$ and wherein a write marker signature has a form of [WRITE, trans id, blobber id, hash(data), block number, i]$_{client}$, permitting an authenticated, authorized, verified transaction on the blockchain based on following three predefined communication messages a first exchange and confirmation between the client and a selected miner directing connection with one or more selected blobbers with an optional Merkle root of the data, wherein the one or more selected blobbers are assigned the transaction each time on a random basis;

a second exchange and confirmation between a client and one or more of the selected blobbers using the marker and wherein the selected blobbers collect the markers; and a third exchange and confirmation between the selected blobber and the miner confirming the marker, and the blockchain platform is configured to get the selected blobber paid from the locked tokens of the client;

wherein the exchange and confirmation communication messages include a transaction of one or more of the following: sending, processing or receiving one or more initiate, update, read, write or delete requests; and forbid a transaction on the blockchain that is one or more of: not authenticated, not authorized, and not verified, and wherein the transaction does not use the corresponding set of two of the three predefined communication messages which correspond to each of the miner, the blobber and the client.

12. The system of claim 11, wherein the module executable on the one or more hardware processors configured to send, process or receive one or more requests is further configured to:
   receive from one or more miners a confirmation of the write request on the blockchain with a list of one or more approved blobbers;
   initiate a storage request to one or more approved blobbers from the list using a secure authentication exchange;
   verify the identity of each of the approved blobber using secure authentication response from the approved blabber;
   optionally encrypt the data for the request;
   apply erasure coding on the data for the request; and
   send data for storage to one or more approved and authenticated blobbers.

13. The system of claim 12, wherein the one or more modules executable on the one or more hardware processors is further configured to:
   (i) select the list of one or more approved blobber; or
   (ii) select blobbers from the list of approved blobbers;
   geographically distribute data to increase the performance and availability of the data.

14. The system of claim 11, wherein the one or more modules executable on the one or more hardware processors is further configured to:
   receive from one or more miners a confirmation of the read request on the blockchain with a randomly selected blobber from a list of blobbers with the stored data and a time period for authorized access of the stored data; and
   receive data from the selected blobber within the authorized time period after the selected blobber has verified the read request.

15. The system of claim 11, wherein the optional Merkle root data is not sent by the client in the first exchange implemented by the one or more modules executable on the one or more hardware processors is, further configured to:
   approve or contest the Merkle root in the second or third exchanges.

16. The system of claim 11, wherein the one or more modules executable on the one or more hardware processors is further configured to:
   lock the authorized tokens for the authorized time period;
   release the authorized tokens after the authorized time period has expired.

17. The system of claim 11, wherein either one of the client, miner or blobber monitor for suspicious activity or report an error.

18. The system of claim 17, wherein the client or the miner can reconstruct a missing slice of the data from other available slices.

19. The system of claim 11, wherein the one or more modules executable on the one or more hardware processors is further configured to:
   verify that the blobber is actually storing the data by periodically issuing challenge requests.

20. The system of claim 11, wherein the blockchain platform is not affected by attacks including one or more of the following: outsourcing, collusion, generation, sybil or replay attacks.

* * * * *